US010787554B2

(12) United States Patent
Sampath et al.

(10) Patent No.: US 10,787,554 B2
(45) Date of Patent: Sep. 29, 2020

(54) PROCESS FOR PRODUCING EXPANDABLE POLYLACTIC ACID-CONTAINING PELLETS

(71) Applicant: BASF SE, Ludwigshafen am Rhein (DE)

(72) Inventors: Bangaru Dharmapuri Sriramulu Sampath, Ludwigshafen am Rhein (DE); Jerome Lohmann, Ludwigshafen am Rhein (DE); Peter Gutmann, Ludwigshafen am Rhein (DE)

(73) Assignee: BASF SE (DE)

( * ) Notice: Subject to any disclaimer, the term of this patent is extended or adjusted under 35 U.S.C. 154(b) by 38 days.

(21) Appl. No.: 16/306,755

(22) PCT Filed: Jun. 1, 2017

(86) PCT No.: PCT/EP2017/063243
§ 371 (c)(1),
(2) Date: Dec. 3, 2018

(87) PCT Pub. No.: WO2017/211660
PCT Pub. Date: Dec. 14, 2017

(65) Prior Publication Data
US 2019/0127545 A1  May 2, 2019

(30) Foreign Application Priority Data
Jun. 7, 2016 (EP) .................................... 16173236

(51) Int. Cl.
| | |
|---|---|
| C08J 9/16 | (2006.01) |
| C08J 9/00 | (2006.01) |
| C08J 9/12 | (2006.01) |
| C08L 67/04 | (2006.01) |
| C08J 9/14 | (2006.01) |
| C08J 3/22 | (2006.01) |
| C08K 3/04 | (2006.01) |
| C08K 3/22 | (2006.01) |
| C08K 5/00 | (2006.01) |

(52) U.S. Cl.
CPC . C08J 9/16 (2013.01); C08J 3/22 (2013.01); C08J 9/0061 (2013.01); C08J 9/127 (2013.01); C08J 9/141 (2013.01); C08L 67/04 (2013.01); *C08J 2201/03* (2013.01); *C08J 2203/06* (2013.01); *C08J 2203/14* (2013.01); *C08J 2203/182* (2013.01); *C08J 2367/04* (2013.01); *C08J 2467/02* (2013.01); *C08K 3/04* (2013.01); *C08K 3/22* (2013.01); *C08K 5/0041* (2013.01); *C08K 2003/2265* (2013.01); *C08L 2203/14* (2013.01)

(58) Field of Classification Search
CPC ........... C08L 67/04; C08J 2367/04; C08J 9/16
See application file for complete search history.

(56) References Cited

U.S. PATENT DOCUMENTS

| | | | |
|---|---|---|---|
| 6,573,308 B1 | 6/2003 | Braun et al. | |
| 9,212,270 B2 | 12/2015 | Füßl et al. | |
| 9,234,073 B2 | 1/2016 | Siegenthaler et al. | |
| 2002/0128356 A1* | 9/2002 | Nakamura | B01J 2/02 |
| | | | 524/88 |
| 2013/0150468 A1* | 6/2013 | Fussi | C08J 9/18 |
| | | | 521/59 |
| 2013/0345327 A1 | 12/2013 | Lohmann et al. | |
| 2015/0259504 A1* | 9/2015 | Takahashi | C08L 67/04 |
| | | | 523/451 |
| 2016/0304751 A1* | 10/2016 | Mussig | B32B 37/12 |
| 2017/0361545 A1 | 12/2017 | Ruckdaschel et al. | |
| 2017/0369667 A1 | 12/2017 | Ruckdaschel et al. | |
| 2018/0009960 A1 | 1/2018 | Ruckdaschel et al. | |
| 2018/0257345 A1 | 9/2018 | Ruckdaschel et al. | |

FOREIGN PATENT DOCUMENTS

| | | |
|---|---|---|
| EP | 2135724 A1 | 12/2009 |
| JP | 2007169394 A | 7/2007 |

(Continued)

OTHER PUBLICATIONS

European Search Report for EP Patent Application No. 16173236.7, dated Nov. 21, 2016.

(Continued)

*Primary Examiner* — Gregory Listvoyb
(74) *Attorney, Agent, or Firm* — Faegre Drinker Biddle & Reath LLP

(57) ABSTRACT

The invention relates to a process for the preparation of expandable polylactic-acid-containing pellets, comprising the steps of
a) Melting and incorporation by mixing of the following components:
  i) from 65 to 95% by weight, based on the total weight of components i to iii, of polylactic acid, where the polylactic acid consists of: ia) from 65 to 95% by weight of polylactic acid with content of from 0.3 to 5% of D-lactic acid and ib) from 5 to 35% by weight of polylactic acid with content of from 10 to 18% of D-lactic acid;
  ii) from 5 to 35% by weight, based on the total weight of components i to iii, of an aliphatic polyester selected from the group consisting of polybutylene succinate, polybutylene succinate-co-adipate and polybutylene succinate-co-sebacate;
  iii) from 0 to 2% by weight, based on the total weight of components i to iii, of a compatibilizer;
  iv) from 0.1 to 5% by weight, based on the total weight of components i to iii, of an additive,
b) incorporation by mixing of
  v) from 1 to 7% by weight, based on the total weight of components i to v, of an organic blowing agent and
  vi) from 0.01 to 5% by weight of a co-blowing agent—selected from the group of nitrogen, carbon dioxide, argon, helium and mixtures thereof—
  into the polymer melt by means of a static or dynamic mixer at a temperature of at least 140° C.,
c) discharge through a die plate with perforations, the diameter of which at the die outlet is at most 1.5 mm, and
d) underwater pelletization of the blowing-agent-containing melt directly downstream of the die plate at a pressure in the range from 1 to 21 bar.

13 Claims, No Drawings

(56) References Cited

FOREIGN PATENT DOCUMENTS

| WO | WO-2001012706 A1 | 2/2001 |
| WO | WO-2008130226 A2 | 10/2008 |
| WO | WO-2010034711 A1 | 4/2010 |
| WO | WO-2011086030 A2 | 7/2011 |
| WO | WO-2016096481 A1 | 6/2016 |
| WO | WO-2017202667 A1 | 11/2017 |
| WO | WO-2017202668 A1 | 11/2017 |

OTHER PUBLICATIONS

International Search Report for PCT/EP2017/063243 dated Sep. 8, 2017.
Written Opinion of the International Searching Authority for PCT/EP2017/063243 dated Sep. 8, 2017.

* cited by examiner

PROCESS FOR PRODUCING EXPANDABLE POLYLACTIC ACID-CONTAINING PELLETS

CROSS-REFERENCE TO RELATED APPLICATIONS

This application is a national stage application (under 35 U.S.C. § 371) of PCT/EP2017/063243, filed Jun. 1, 2017, which claims benefit of European Application No. 16173236.7, filed Jun. 7, 2016, both of which are incorporated herein by reference in their entirety.

The invention relates to a process for the preparation of expandable polylactic-acid-containing pellets, comprising the steps of:
a) Melting and incorporation by mixing of the following components:
  i) from 65 to 95% by weight, based on the total weight of components i to iii, of polylactic acid, where the polylactic acid consists of: ia) from 65 to 95% by weight of polylactic acid with content of from 0.3 to 5% of D-lactic add and ib) from 5 to 35% by weight of polylactic acid with content of from 10 to 18% of D-lactic add;
  ii) from 15 to 35% by weight, based on the total weight of components i to iii, of an aliphatic polyester selected from the group consisting of polybutylene succinate, polybutylene succinate-co-adipate and polybutylene succinate-co-sebacate;
  iii) from 0 to 2% by weight, based on the total weight of components i to iii, of a compatibilizer and
  iv) from 0.1 to 5% by weight, based on the total weight of components i to iii, of an additive,
b) incorporation by mixing of
  v) from 1 to 7% by weight, based on the total weight of components i to iv, of an organic blowing agent and
  vi) from 0.01 to 5% by weight of a co-blowing agent—selected from the group of nitrogen, carbon dioxide, argon, helium and mixtures thereof—
    into the polymer melt by means of a static or dynamic mixer at a temperature of at least 140° C.,
c) discharge through a die plate with perforations, the diameter of which at the die outlet is at most 1.5 mm, and
d) underwater pelletization of the blowing-agent-containing melt directly downstream of the die plate at a pressure in the range from 1 to 21 bar.

Processes for the preparation of expandable polylactic-acid-containing pellets (moldable polylactic-acid-containing foams) are described in WO 2001/012706 and in particular in WO 2011/086030. However, the shelf life of the expandable, blowing-agent-containing, polylactic-acid-containing pellets described therein is not entirely satisfactory.

WO 2008/130226 and JP2007 169394 describe expanded or expandable moldable foams with densities of from 10 to 100 g/l which have already been prefoamed and can be post-impregnated with blowing agent. Shelf life is not particularly important for those moldable foams because when they are transported to the end user (storage period) they comprise no, or almost no, blowing agent.

It was an object of the present invention to provide a simple process for the preparation of expandable, blowing-agent-containing polylactic-acid-containing pellets with improved shelf life.

The process described in the introduction has accordingly been found.

The process of the invention is described in more detail below.

The polylactic-acid-containing polymer that is produced in stage a) is generally a mixture of:
i) from 65 to 95% by weight, preferably from 70 to 79.9% by weight, based on the total weight of components i to iii, of polylactic acid, where the polylactic acid consists of: ia) from 65 to 95% by weight, preferably from 80 to 95% by weight, of polylactic acid with content of from 0.3 to 5% of D-lactic acid and ib) from 5 to 35% by weight, preferably from 5 to 20% by weight, of polylactic acid with content of from 10 to 18% of D-lactic acid;
ii) from 15 to 35% by weight, preferably from 20 to 29.9% by weight, based on the total weight of components i to iii, of at least one polyester selected from the group consisting of polybutylene succinate, polybutylene succinate-co-adipate and polybutylene succinate-co-sebacate;
iii) from 0 to 2% by weight, preferably from 0.1 to 1% by weight, based on the total weight of components i to iii, of a compatibilizer, preferably of a peroxide or of an epoxy-group-containing copolymer based on styrene, acrylate and/or methacrylate, and
iv) from 0 to 5% by weight, preferably from 0.1 to 1% by weight, based on the total weight of components i to iii, of one or more nucleating agents, preferably talc powder.

Polylactic add is used as component i) in the form of a mixture of ia) from 65 to 95% by weight of a semicrystalline polylactic acid with from 0.3 to 5% content of D-lactic acid and ib) from 5 to 35% by weight of an amorphous polylactic acid with from 10 to 18% content of D-lactic acid.

It is preferable to use a semicrystalline polylactic acid with the following property profile:
 melt volume rate (MVR for 190° C. and 2.16 kg in accordance with ISO 1133) of from 0.5 to 15 ml/10 minutes, preferably from 1 to 9 ml/10 minutes, particularly preferably from 2 to 8 ml/10 minutes
 melting point below 180° C.;
 glass transition temperature (Tg) above 40° C.
 water content smaller than 1000 ppm
 residual monomer content (lactide) smaller than 0.3%.
 molecular weight greater than 50 000 daltons.

Preferred polylactic acids are by way of example the following from NatureWorks: Ingeo® 2003 D, 4032 D, 4042 D and 4043 D, 3251 D, 3052 D and in particular 8051 D, and also 8052 D. Ingeo® 8051 D and 8052 D are polylactic acids from NatureWorks with the following product properties: Tg: 65.3° C., Tm: 153.9° C., MVR: 6.9 [ml/10 minutes], $M_w$: 186 000, Mn: 107 000 and less than 5% content of D-lactic acid. These products moreover have an acid number that is relatively high.

Amorphous polylactic acid has more than 10% content of D-lactic acid, but generally not more than 18%. A particularly suitable amorphous polylactic acid is obtainable with trademark Ingeo® 4060 D from NatureWorks, with from 11 to 13% content of D-lactic acid. Other examples of polylactic acid from NatureWorks are Ingeo 6302 D, 6362 D and 10361 D.

Component ii is aliphatic polyesters selected from the group consisting of polybutylene succinate, polybutylene succinate-co-adipate and polybutylene succinate-co-sebacate.

The aliphatic polyesters are marketed as Bionolle by Showa Highpolymers and as GSPla or BioPBS by Mitsubishi. WO 2010/034711 describes developments that are relatively recent.

Intrinsic viscosities of the aliphatic polyesters in accordance with DIN 53728 are generally from 150 to 320 cm³/g and preferably from 150 to 250 cm³/g.

MVR (melt volume rate) in accordance with EN ISO 1133 (190° C., 2.16 kg weight) is generally from 0.1 to 70 cm$^3$/10 min, preferably from 0.8 to 70 cm$^3$/10 min, and in particular from 1 to 60 cm$^3$/10 min.

Acid numbers in accordance with DIN EN 12634 are generally from 0.01 to 3 mg KOH/g, preferably from 0.01 to 2.5 mg KOH/g.

Preferred polyesters ii used comprise:
a) from 80 to 100 mol %, preferably from 90 to 99.5 mol %, based on components a to b, of succinic acid;
b) from 0 to 20 mol %, preferably from 0.5 to 10 mol %, based on components a to b, of adipic acid or sebacic acid;
c) from 85 to 100 mol %, preferably from 98 to 100 mol %, based on components a to b, of 1,3-propanediol or 1,4-butanediol;
d) from 0 to 15% by weight, preferably from 0.1 to 2% by weight, based on the total weight of components a to c, of a chain extender and/or crosslinking agent selected from the group consisting of: a polyfunctional isocyanate, for example preferably hexamethylene diisocyanate; isocyanurate; oxazoline; epoxide and/or an at least trihydric alcohol, for example preferably glycerol.

The compatibilizer iii) is described in more detail below.

The term peroxides means by way of example the products marketed with trademark Trigonox by Akzo, for example Trigonox 301.

The term epoxides means in particular epoxy-group-containing copolymer based on styrene, acrylate and/or methacrylate. The units bearing epoxy groups are preferably glycidyl (meth)acrylates. Copolymers that have proven advantageous have more than 20% by weight content of glycidyl methacrylate, particularly preferably more than 30% by weight, and with particular preference more than 50% by weight, based on the copolymer. The epoxy equivalent weight (EEW) in these polymers is preferably from 150 to 3000 g/equivalent and with particular preference from 200 to 500 g/equivalent. The average molecular weight (weight average) $M_w$ of the polymers is preferably from 2000 to 25 000, in particular from 3000 to 8000. The average molecular weight (number average) $M_n$ of the polymers is preferably from 400 to 6000, in particular from 1000 to 4000. The polydispersity (Q) is generally from 1.5 to 5. Epoxy-group-containing copolymers of the abovementioned type are marketed by way of example with the trademark Joncryl® ADR by BASF Resins B.V. A particularly suitable compatibilizer is Joncryl® ADR 4368 or Joncryl ADR 4468C or Joncryl ADR 4468HP.

The quantity added of the compatibilizer, based on the total weight of components i) to iii), is from 0 to 2% by weight, preferably from 0.1 to 1% by weight.

The term component iv) means from 0.01 to 5% by weight of one or more of the following additives: stabilizer, nucleating agent, lubricant and release agent, surfactant, wax, antistatic agent, antifogging agent, dye, pigment, UV absorber, UV stabilizer or other plastics additives. In particular, it is preferable as already mentioned to use from 0.2 to 1% by weight, based on components i) and ii), of a nucleating agent.

The term nucleating agent means in particular talc powder, chalk, carbon black, graphite, calcium stearate or zinc stearate, poly-D-lactic acid, N,N'-ethylenebis(12-hydroxystearamide) or polyglycolic acid. Particular preference is given to talc powder as nucleating agent.

Carbon black, chalk and graphite can also be interpreted as pigments; they, like iron oxide and other color pigments, can be added to the moldable foam in order to establish a desired color. A paper-like appearance can advantageously be achieved by adding Sicoversal®, a color masterbatch from BASF Color Solutions, comprising carbon black, iron oxide and a yellow pigment. The pigments iv-2 are generally used at a concentration of from 0.1 to 1% by weight, based on the reaction mixture.

Component iv) can comprise other ingredients that are known to the person skilled in the art but are not essential to the invention. Examples are the additional substances conventionally used in plastics technology, e.g. stabilizers; lubricants and release agents, e.g. stearates (in particular calcium stearate); plasticizers, e.g. citric esters (in particular tributyl acetylcitrate) glycerol esters, e.g. triacetylglycerol, or ethylene glycol derivatives, surfactants, e.g. polysorbates, palmitates or laurates; waxes, e.g. beeswax or beeswax esters; antistatic agents, UV absorbers; UV stabilizers; antifogging agents and dyes.

The blowing agents can be interpreted as further component v).

The blowing-agent-containing polymer melt generally comprises one or more blowing agents in homogeneous distribution in a total proportion of from 2 to 10% by weight, preferably from 3 to 7% by weight, based on the blowing-agent-containing polymer melt. Suitable blowing agents are the physical blowing agents conventionally used in EPS, e.g. aliphatic hydrocarbons having from 2 to 7 carbon atoms, alcohols, ketones, ethers, amides or halogenated hydrocarbons. It is preferable to use isobutane, n-butane, n-pentane or in particular isopentane. Preference is further given to mixtures of n-pentane and isopentane.

The quantity of blowing agent added is selected to give the expandable pellets an expansion capability α, defined as bulk density before prefoaming of from 500 to 800 kg/m$^3$ and preferably from 580 to 750 kg/m$^3$ and bulk density after prefoaming of at most 125 kg/m, preferably from 8 to 100 kg/m$^3$.

When fillers are used, bulk densities in the range from 590 to 1200 kg/m$^3$ can occur, depending on the nature and quantity of the filler.

For preparation of the expandable pellets of the invention, the blowing agent is incorporated by mixing into the polymer melt. The process comprises the following stages: A) melt production, B) mixing, C) conveying, and D) pelletization. Each of these stages can be implemented in the apparatuses or apparatus combinations known in plastics processing. Static or dynamic mixers, for example extruders, are suitable for the incorporation by mixing. The polymer melt can be produced directly via melting of polymer pellets. The temperature of the melt can if necessary be reduced by way of a cooler. Possible pelletization methods by way of example are triterized underwater pelletization and pelletization using rotating blades and cooling by spray-misting of temperature-control liquids. Examples of apparatus arrangements suitable for the conduct of the process are:
i) extruder-static mixer-cooler-pelletizer
ii) extruder-pelletizer.

The arrangement can moreover have an ancillary extruder for the introduction of additives, e.g. of solids or heat-sensitive additional substances.

The temperature of the blowing-agent-containing polymer melt when it is conveyed through the die plate is generally in the range from 140 to 300° C., preferably in the range from 160 to 270° C.

In order to obtain marketable pellet sizes, the diameter (D) of the die perforations at the die outlet should be in the range from 0.1 to 2 mm, preferably in the range from 0.1 to 1.2 mm, particularly preferably in the range from 0.1 to 0.8 mm.

This permits controlled adjustment to pellet sizes, after die swell, of less than 2 mm, in particular in the range from 0.2 to 1.4 mm.

Die swell can be influenced not only by way of the molecular weight distribution but also by the geometry of the die. The die plate preferably has perforations with an L/D ratio of at least 2, where the length (L) relates to that region of the die that has a diameter at most equal to the diameter (D) at the die outlet. The L/D ratio is preferably in the range from 3 to 20.

The diameter (E) of the perforations at the die inlet of the die plate should generally be at least twice as great as the diameter (D) at the die outlet.

An embodiment of the die plate has perforations with conical ingoing section and an ingoing-section angle α smaller than 180°, preferably in the range from 30 to 120°. In another embodiment, the die plate has perforations with conical outgoing section and an outgoing-section angle β smaller than 90°, preferably in the range from 15 to 45°. In order to produce specific pellet size distributions of the polymers, the die plate can be equipped with perforations of different outlet diameter (D). The various embodiments of the die geometry can also be combined with one another.

The pellets generally have an average diameter in the range from 0.1 to 2 mm, and from 50 to 300 cavities/mm$^2$ of cross-sectional area. The temperature reduction during underwater pelletization can reduce bulk density to the range from 580 to 750 kg/m$^3$ and preferably from 580 to 720 kg/m$^3$. The expandable polylactic-acid-containing pellets thus prepared moreover have an increased shelf life. The increased shelf lives of the pellets prepared in the invention are in particular attributable a) to the process of prenucleation through the use of a combination of organic blowing agent v) and co-blowing agent vi), and b) to the use of a mixture of semicrystalline and amorphous component i) in the stated, narrow mixing ratios. After some weeks, the pellets can still be foamed without difficulty.

By using volatile, liquid/gaseous cavity-forming co-blowing agents vi), it is possible to establish, in the expandable pellets, a cellular structure which can be used to improve the subsequent foaming procedure and to control the cell size.

The process for establishing this cavity morphology can also be termed prenucleation, where the cavities are in essence formed by the co-blowing agent vi).

The co-blowing agent vi) which forms the cavities differs from the actual blowing agent v) in its solubility in the polymer. During the production process, blowing agent v) and co-blowing agent vi) are initially completely dissolved in the polymer at sufficiently high pressure. The pressure is then reduced, preferably within a short time, and the solubility of the co-blowing agent vi) is thus reduced. A phase separation thus becomes established in the polymeric matrix, and a prenucleated structure is produced. The actual blowing agent v) remains predominantly dissolved in the polymer, because it has higher solubility and/or a lower diffusion rate. At the same time as the pressure reduction, a temperature reduction is preferably carried out in order to prevent excessive nucleation of the system and to reduce outward diffusion of the actual blowing agent v). This is achieved via co-blowing agent vi) in conjunction with ideal pelletization conditions.

At least 80% by weight of the co-blowing agent vi) preferably escapes from the expandable thermoplastic beads within 24 h during storage at 25° C., atmospheric pressure and 50% relative humidity. The solubility of the co-blowing agent vi) in the expandable thermoplastic beads is preferably below 0.1% by weight. In all cases, the quantity added of the co-blowing agent vi) used should, during the prenucleation procedure, exceed the maximal solubility under the prevailing process conditions. It is therefore preferable to use co-blowing agents vi) which have low, but adequate, solubility in the polymer. Among these are in particular gases such as nitrogen, carbon dioxide, air and noble gases, particularly preferably nitrogen, the solubility of which in many polymers decreases at low temperatures and pressures. However, other liquid additives can also be used.

It is particularly preferable to use inert gases such as nitrogen and carbon dioxide. Both gases feature not only suitable physical properties but also low costs, good availability, easy handling and unreactive or inert behavior. By way of example, in almost all cases no degradation of the polymer takes place in the presence of the two gases. The gases themselves are obtained from the atmosphere, and they therefore are also environmentally neutral.

The quantity used of the co-blowing agent vi) here should: (a) be sufficiently small to dissolve at the prevailing melt temperatures and melt pressures during melt impregnation leading to pelletization; (b) be sufficiently great to demix from the polymer at pelletization water pressure and pelletization temperature, and nucleate. In a preferred embodiment, at least one of the blowing agents used is gaseous at room temperature and atmospheric pressure.

It is particularly preferable to use talc powder as nucleating agent iv) in combination with nitrogen as co-blowing agent vi).

Transport and storage of the expandable pellets can be achieved by using, inter alia, metal drums and octabins. A factor requiring consideration when drums are used is that the release of the co-blowing agents vi) can sometimes increase pressure in the drum. It is therefore preferable to use, as packaging, open packs such as octabins or drums which permit dissipation of pressure via permeation of the gas out of the drum.

Particular preference is given here to drums which permit outward diffusion of the co-blowing agent vi) and minimize or prevent outward diffusion of the actual blowing agent v). This can be possible by way of example by selecting the sealing material to be appropriate for the blowing agent and, respectively, co-blowing agent vi). It is preferable that the permeability of the sealing material to the co-blowing agent vi) is higher by a factor of at least 20 than the permeability of the sealing material to the blowing agent v).

The prenucleation procedure, for example via addition of small quantities of nitrogen and/or carbon dioxide, can establish a cellular morphology in the expandable, blowing-agent-containing pellets. The average cell size in the center of the beads here is greater than in the peripheral regions; the density is higher in the peripheral regions of the beads. Blowing agent losses are thus minimized.

By virtue of the prenucleation it is possible to achieve significantly better cell size distribution and reduced cell size after prefoaming. The quantity of blowing agent required to achieve a minimal bulk density is moreover smaller, and the material has improved shelf life. When small quantities of nitrogen or carbon dioxide are added into the melt, these can lead to a significant shortening of the prefoaming times for constant blowing agent content or to a significant reduction of the quantities of blowing agent for identical foaming times and minimal foam densities. The prenucleation moreover improves product homogeneity and process stability.

Further impregnation of the polymer pellets of the invention by a blowing agent can moreover be achieved significantly more rapidly than in the case of pellets with identical composition and compact, i.e. non-cellular, structure. Firstly, the diffusion times are shorter; secondly, quantities of blowing agent required for the foaming procedure are smaller than in the case of directly impregnated systems.

Finally, the prenucleation procedure can reduce the blowing agent content required in order to achieve a particular density, and can thus reduce the demolding times in the production of moldings or blocks. This permits reduction of further-processing costs and improvement of product quality.

The prenucleation principle can be utilized both for suspension technology and for melt impregnation technology for the production of expandable beads. Preference is given to the use in the melt extrusion process where after addition of the co-blowing agents vi) pelletization is achieved by pressure-assisted underwater pelletization after discharge of the blowing-agent-loaded melt. The microstructure of the pellets can be controlled as described above via selection of the pelletization parameters and of the co-blowing agent vi).

With relatively high quantities of co-blowing agent vi), for example in the range from 1 to 5% by weight, based on the blowing-agent-containing polymer melt, it is possible to reduce the melt temperature or the melt viscosity and thus significantly increase throughput. This also permits use of relatively mild conditions for incorporation of heat-sensitive additional substances, for example flame retardants, into the polymer melt. There is no resultant change to the composition of the expandable thermoplastic beads, because the co-blowing agent is in essence lost from the material during extrusion of the melt. This effect is preferably utilized by using $CO_2$. In the case of $N_2$, the effects on viscosity are smaller. Nitrogen is therefore used mainly to establish the desired cell structure.

The liquid-filled chamber for the pelletization of expandable thermoplastic polymer beads is preferably operated at a temperature in the range from 20 to 80° C., particularly preferably in the range from 30 to 60° C.

In order to minimize thermal degradation of the polylactic acid, it is moreover advantageous to minimize introduction of mechanical and thermal energy in all stages of the process. The average shear rates in the screw channel should be low; preference is given to shear rates below 250/sec, preferably below 100/sec, and temperatures below 270° C., and also to short residence times in the range from 2 to 10 minutes in the stages c) and d). The residence times without cooling step are generally from 1.5 to 4 minutes, and where a cooling step is provided the times are generally from 5 to 10 minutes. Pumps, for example gear pumps, can be used to convey and discharge the polymer melt.

Processability can be improved by using glycerol esters, antistatic agents or anticaking agents to coat the finished expandable pellets.

The expandable pellets of the invention exhibit less caking than pellets comprising low-molecular-weight plasticizers, and feature good retention of pentane during storage. The expandable pellets of the invention can be pre-foamed in a first step by means of hot air or of steam to give foam beads with density in the range from 8 to 100 kg/m³, and can be welded in a 2nd step in a closed mold to give molded foams.

The pellets produced by the process of the invention have high biodegradability together with good foaming properties. For the purposes of the present invention, compliance with the "biodegradable" feature is achieved for a substance or a substance mixture if said substance or the substance mixture exhibits a percentage degree of biodegradation of at least 90% in accordance with DIN EN 13432.

The result of biodegradability is generally that the pellets or foams produced therefrom decompose within an appropriate and demonstrable period of time. The degradation can take place by an enzymatic, hydrolytic, or oxidative route, and/or via exposure to electromagnetic radiation, for example UV radiation, and can mostly be brought about predominantly through exposure to microorganisms such as bacteria, yeast, fungi and algae. Biodegradability can by way of example be quantified by mixing polyester with compost and storing the same for a defined period. By way of example, in accordance with DIN EN 13432 $CO_2$-free air is passed through ripened compost during the composting process. The compost is subjected to a defined temperature profile. Biodegradability is defined here as a percentage degree of biodegradation by taking the ratio of the net quantity of $CO_2$ released from the sample (after subtraction of the $CO_2$ released by the compost in the absence of the sample) to the maximal quantity of $CO_2$ that can be released from the sample (calculated from the carbon content of the sample). Biodegradable pellets generally exhibit clear signs of degradation after just a few days of composting, examples being fungal growth, cracking and perforation.

Other methods for determining biodegradability are described by way of example in ASTM D5338 and ASTM D6400-4.

EXAMPLES

Materials Used:
Component i:
i-1a: aliphatic polyester, Natureworks® 8052 D polylactide from NatureWorks with 4.5% content of D-lactic acid
i-1b: aliphatic polyester, Natureworks® 4060 D polylactide from NatureWorks with 12% content of D-lactic acid
Component ii:
ii-1: aliphatic polyester, GSPIa FZ91 PD polybutylene succinate from MCC
Component iii:
iii-1: Joncryl ADR 44688 C from BASF SE
Component iv:
iv-1: HP 325 Chinatalk from Luzenac
iv-2: Sicoversal® color masterbatch (25% with carbon black, iron oxide and monoazo yellow pigment as additive and aliphatic polyester ii-1 as carrier) from BASF Color Solutions
Component v:
v-1: blowing agent: isopentane
Component vi:
vi-1: co-blowing agent: nitrogen ($N_2$)

Comparative Example 1: (without Component i-1b)

6.7 parts of isopentane (component v-1) and 0.12 part of nitrogen (vi-1) were incorporated by mixing into a melt made of 75 parts of component i-1a, 25 parts of component ii-1, 0.2 part of component iii-1 and 0.3 part of component iv-1 at a melt temperature of from 200 to 240° C.

The melt was conveyed at 70 kg/h throughput through a die plate with 50 perforations (diameter 0.65 mm), the temperature of the die plate being 260° C. Prenucleated pellets with narrow pellet size distribution were produced by pressurized, temperature-controlled underwater pelletization (20 bar—40° C.).

The pellets were stored for a defined time at room temperature or at 37° C. and then prefoamed by exposure to a current of steam and, in a 2nd step, fused in a closed mold to give molded foams.

Flexural strength and bending energy were determined on the moldings in accordance with DIN EN 12089.

Inventive Example 2: (with 10% of Component i-1b)

6.7 parts of isopentane (component v-1) and 0.12 part of nitrogen (vi-1) were incorporated by mixing into a melt made of 65 parts of component i-1a, 10 parts of component i-1b, 25 parts of component ii-1, 0.2 part of component iii-1 and 0.3 part of component iv-1 at a melt temperature of from 200 to 240° C.

The melt was conveyed at 70 kg/h throughput through a die plate with 50 perforations (diameter 0.65 mm), the temperature of the die plate being 260° C. Prenucleated pellets with narrow pellet size distribution were produced by pressurized, temperature-controlled underwater pelletization (20 bar—40° C.).

The pellets were stored for a defined time at room temperature or at 37° C. and then prefoamed by exposure to a current of steam and, in a 2nd step, fused in a closed mold to give molded foams.

Flexural strength and bending energy were determined on the moldings in accordance with DIN EN 12089.

Comparative Example 3: (without Component i-1b and without Component ii-1)

6.7 parts of isopentane (component v-1) and 0.12 part of nitrogen (vi-1) were incorporated by mixing into a melt made of 100 parts of component i-1a, 0.2 part of component iii-1 and 0.3 part of component iv-1 at a melt temperature of from 200 to 240° C.

The melt was conveyed at 70 kg/h throughput through a die plate with 50 perforations (diameter 0.65 mm), the temperature of the die plate being 260° C. Prenucleated pellets with narrow pellet size distribution were produced by pressurized, temperature-controlled underwater pelletization (20 bar—40° C.).

The pellets were stored for a defined time at room temperature or at 37° C. and then prefoamed by exposure to a current of steam.

Comparative Example 4: (without Component ii-1)

6.7 parts of isopentane (component v-1) and 0.12 part of nitrogen (vi-1) were incorporated by mixing into a melt made of 90 parts of component i-1a, 10 parts of component i-1b, 0.2 part of component iii-1 and 0.3 part of component iv-1 at a melt temperature of from 200 to 240° C.

The melt was conveyed at 70 kg/h throughput through a die plate with 50 perforations (diameter 0.65 mm), the temperature of the die plate being 260° C. Prenucleated pellets with narrow pellet size distribution were produced by pressurized, temperature-controlled underwater pelletization (20 bar—40° C.).

The pellets were stored for a defined time at room temperature or at 37° C. and then prefoamed by exposure to a current of steam.

Comparative Example 5: (without Component i-1b and Component vi-1)

6.7 parts of isopentane (component v-1) were incorporated by mixing into a melt made of 90 parts of component i-1a, 10 parts of i-1b, 0.2 part of component iii-1 and 0.3 part of component iv-1 at a melt temperature of from 200 to 240° C.

The melt was conveyed at 70 kg/h throughput through a die plate with 50 perforations (diameter 0.65 mm), the temperature of the die plate being 260° C. Prenucleated pellets with narrow pellet size distribution were produced by pressurized, temperature-controlled underwater pelletization (20 bar—40° C.).

Inventive Example 6: (with Color Masterbatch)

6.2 parts of isopentane (component v-1) and 0.12 part of nitrogen (vi-1) were incorporated by mixing into a melt made of 69.4 parts of component i-1a, 5 parts of component i-1b, 24.9 parts of component ii-1, 0.2 part of component iii-1, 0.4 part of component iv-1 and 0.3 part of component v-2 at a melting temperature of from 200-240° C.

The melt was conveyed at 70 kg/h throughput through a die plate with 50 perforations (diameter 0.65 mm), the temperature of the die plate being 260° C. Prenucleated pellets with narrow pellet size distribution were produced by pressurized, temperature-controlled underwater pelletization (20 bar—40° C.).

The pellets were stored for a defined time at room temperature or at 37° C. and then prefoamed by exposure to a current of steam.

Inventive Example 7: (with Color Masterbatch)

6.2 parts of isopentane (component v-1) and 0.12 part of nitrogen (vi-1) were incorporated by mixing into a melt made of 69.4 parts of component i-1a, 5 parts of component i-1b, 24.1 parts of component ii-1, 0.2 part of component iii-1, 1.2 parts of component iv-1 and 0.3 part of component iv-2 at a melting temperature of from 200-240° C.

The melt was conveyed at 70 kg/h throughput through a die plate with 50 perforations (diameter 0.65 mm), the temperature of the die plate being 260° C. Prenucleated pellets with narrow pellet size distribution were produced by pressurized, temperature-controlled underwater pelletization (20 bar—40° C.).

The pellets were stored for a defined time at room temperature or at 37° C. and then prefoamed by exposure to a current of steam.

Inventive Example 8: (with Color Masterbatch)

6.2 parts of isopentane (component v-1) and 0.12 part of nitrogen (vi-1) were incorporated by mixing into a melt made of 69.4 parts of component i-1a, 5 parts of component i-1b, 23.3 parts of component ii-1, 0.2 part of component iii-1, 2 parts of component iv-1 and 0.3 part of component iv-2 at a melting temperature of from 200-240° C.

The melt was conveyed at 70 kg/h throughput through a die plate with 50 perforations (diameter 0.65 mm), the temperature of the die plate being 260° C. Prenucleated pellets with narrow pellet size distribution were produced by pressurized, temperature-controlled underwater pelletization (20 bar—40° C.).

The pellets were stored for a defined time at room temperature or at 37° C. and then prefoamed by exposure to a current of steam.

Inventive Example 9: (with Color Masterbatch)

6.2 parts of isopentane (component v-1) and 0.12 part of nitrogen (vi-1) were incorporated by mixing into a melt made of 69.4 parts of component i-1a, 5 parts of component i-ib, 21.3 parts of component ii-1, 0.2 part of component iii-1, 4 parts of component iv-1 and 0.3 part of component iv-2 at a melting temperature of from 200-240° C.

The melt was conveyed at 70 kg/h throughput through a die plate with 50 perforations (diameter 0.65 mm), the temperature of the die plate being 260° C. Prenucleated pellets with narrow pellet size distribution were produced by pressurized, temperature-controlled underwater pelletization (20 bar—40° C.).

The pellets were stored for a defined time at room temperature or at 37° C. and then prefoamed by exposure to a current of steam.

|  | CE1 | E2 | CE3 | CE4 | CE5 |
|---|---|---|---|---|---|
| Component i-1a | 75 | 65 | 100 | 90 | 90 |
| Component i-1b | 0 | 10 | 0 | 10 | 10 |
| Component ii-1 | 25 | 25 | 0 | 0 | 0 |
| Component iii-1 | 0.2 | 0.2 | 0.2 | 0.2 | 0.2 |
| Component iv-1 | 0.3 | 0.3 | 0.3 | 0.3 | 0.3 |
| Component v-1 | 6.7 | 6.7 | 6.7 | 6.7 | 6.7 |
| Component vi-1 | 0.12 | 0.12 | 0.12 | 0.12 | 0 |
| Throughput(kg/h) | 70 | 70 | 70 | 70 | 70 |
| Die plate temperature (° C.) | 260 | 260 | 260 | 260 | 260 |
| Underwater pelletization pressure (bar) | 20 | 20 | 20 | 20 | 20 |
| Underwater pelletization temperature (° C.) | 40 | 40 | 40 | 40 | 40 |
| Min. bulk density of foam after production (kg/m$^3$) | 26.4 | 24.1 | 21.4 | 22.0 | NA |
| Min. bulk density of foam after 7 days of storage at room temperature (kg/m$^3$) | 26.2 | 24.4 | 21.9 | 22.4 | NA |
| Min. bulk density of foam after 14 days of storage at room temperature (kg/m$^3$) | 26.6 | 24.1 | 21.8 | 22.3 | NA |
| Min. bulk density of foam after 7 days of storage at 37° C. (kg/m$^3$) | 51.5 | 27.7 | 410 | 87 | NA |
| Min. bulk density of foam after 14 days of storage at 37° C. (kg/m$^3$) | 111.0 | 60.0 | 560 | 302 | NA |
| Bending energy in accordance with DIN EN 12089 (J/(kg/m$^3$)) after 14 days of storage at room temperature | 0.06 | 0.14 | — | — | — |

NA: does not foam

The process described in WO 08/130226 (see comparative example 5 without prenucleation and without inventive component ii) does not give expandable blowing-agent-containing pellets. The significantly improved process of WO 11/086030 (see comparative example 1) gives expandable blowing-agent-containing pellets with shelf life more than 2 weeks at room temperature, but the results are less satisfactory at the higher temperatures that certainly can occur briefly during transport. As shown by example 2, the process of the invention gives expandable blowing-agent-containing pellets which also have good shelf life at relatively high temperature.

When example 2 is compared with example 1, furthermore, the product from the former has better mechanical properties.

The invention claimed is:
1. A process for the preparation of expandable polylactic-acid-containing pellets, comprising the steps of:
   a) Melting and incorporation by mixing of the following components:
      i) from 65 to 95% by weight, based on the total weight of components i to iii, of polylactic acid, where the polylactic acid consists of: ia) from 65 to 95% by weight of polylactic acid with content of from 0.3 to 5% of D-lactic acid and ib) from 5 to 35% by weight of polylactic acid with content of from 10 to 18% of D-lactic acid;
      ii) from 5 to 35% by weight, based on the total weight of components i to iii, of an aliphatic polyester selected from the group consisting of polybutylene succinate, polybutylene succinate-co-adipate and polybutylene succinate-co-sebacate;
      iii) from 0 to 2% by weight, based on the total weight of components i to iii, of a compatibilizer; and
      iv) from 0.1 to 5% by weight, based on the total weight of components i to iii, of an additive,
   b) incorporation by mixing of
      v) from 1 to 7% by weight, based on the total weight of components i to iv, of an organic blowing agent and
      vi) from 0.01 to 5% by weight of a co-blowing agent—selected from the group of nitrogen, carbon dioxide, argon, helium and mixtures thereof—into the polymer melt by means of a static or dynamic mixer at a temperature of at least 140° C.,
   c) discharge through a die plate with perforations, the diameter of which at the die outlet is at most 1.5 mm, and
   d) underwater pelletization of the blowing-agent-containing melt directly downstream of the die plate at a pressure in the range from 1 to 21 bar.

2. The process according to claim 1, wherein the underwater pelletization is carried out at from 20 to 80° C.

3. The process according to claim 1, wherein isopentane is used as organic blowing agent in stage b).

4. The process according to claim 1, wherein in stage a) a color masterbatch comprising iron oxide, carbon black and an organic yellow pigment is added to the melt.

5. The process according to claim 2, wherein isopentane is used as organic blowing agent in stage b).

6. The process according to claim 5, wherein in stage a) a color masterbatch comprising iron oxide, carbon black and an organic yellow pigment is added to the melt.

7. The process according to claim 1, wherein the polylactic-acid-containing polymer that is produced in stage a) is a mixture of:
   i) from 70 to 79.9% by weight, based on the total weight of components i to iii, of polylactic acid, where the polylactic acid consists of: ia) from 80 to 95% by weight, of polylactic acid with content of from 0.3 to 5% of D-lactic acid and ib) from 5 to 20% by weight, of polylactic acid with content of from 10 to 18% of D-lactic acid;
   ii) from 20 to 29.9% by weight, based on the total weight of components i to iii, of at least one polyester selected from the group consisting of polybutylene succinate, polybutylene succinate-co-adipate and polybutylene succinate-co-sebacate;
   iii) from 0.1 to 1% by weight, based on the total weight of components i to iii, of a compatibilizer, and
   iv) from 0.1 to 1% by weight, based on the total weight of components i to iii, of one or more nucleating agents.

8. The process according to claim 6, wherein the polylactic-acid-containing polymer that is produced in stage a) is a mixture of:
   i) from 70 to 79.9% by weight, based on the total weight of components i to iii, of polylactic acid, where the polylactic acid consists of: ia) from 80 to 95% by weight, of polylactic acid with content of from 0.3 to 5% of D-lactic acid and ib) from 5 to 20% by weight, of polylactic acid with content of from 10 to 18% of D-lactic acid;

ii) from 20 to 29.9% by weight, based on the total weight of components i to iii, of at least one polyester selected from the group consisting of polybutylene succinate, polybutylene succinate-co-adipate and polybutylene succinate-co-sebacate;

iii) from 0.1 to 1% by weight, based on the total weight of components i to iii, of a compatibilizer which is a peroxide or of an epoxy-group-containing copolymer based on styrene, acrylate and/or methacrylate, and iv) from 0.1 to 1% by weight, based on the total weight of components i to iii, of one or more nucleating agents which is talc powder.

9. The process as claimed in claim 1, wherein component ib is polylactic acid with content of from 11 to 13% content of D-lactic acid.

10. The process as claimed in claim 8, wherein component ib is polylactic acid with content of from 11 to 13% content of D-lactic acid.

11. The process as claimed in claim 1, wherein polyesters ii comprises:
   a) from 80 to 100 mol %, based on components a to b, of succinic acid;
   b) from 0 to 20 mol %, based on components a to b, of adipic acid or sebacic acid;
   c) from 85 to 100 mol %, based on components a to b, of 1,3-propanediol or 1,4-butanediol;
   d) from 0 to 15% by weight, based on the total weight of components a to c, of a chain extender and/or cross-linking agent selected from the group consisting of: a polyfunctional isocyanate.

12. The process as claimed in claim 10, wherein polyesters ii comprises:
   a) from 90 to 99.5 mol %, based on components a to b, of succinic acid;
   b) from 0.5 to 10 mol %, based on components a to b, of adipic acid or sebacic acid;
   c) from 98 to 100 mol %, based on components a to b, of 1,3-propanediol or 1,4-butanediol;
   d) from 0.1 to 2% by weight, based on the total weight of components a to c, of a chain extender and/or cross-linking agent selected from the group consisting of: hexamethylene diisocyanate; isocyanurate; oxazoline; epoxide and/or an at least trihydric alcohol.

13. The process as claimed in claim 1, wherein the pellets produced by the process of the invention exhibits a percentage degree of biodegradation of at least 90% in accordance with DIN EN 13432.

* * * * *